United States Patent
Abu-Husein

(10) Patent No.: US 7,107,537 B2
(45) Date of Patent: Sep. 12, 2006

(54) APPARATUS AND METHOD FOR UPDATING APPLICATIONS TO EMBEDDED DEVICES AND PERIPHERALS WITHIN A NETWORK ENVIRONMENT

(75) Inventor: Loay Abu-Husein, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 625 days.

(21) Appl. No.: 09/765,882

(22) Filed: Jan. 16, 2001

(65) Prior Publication Data

US 2002/0095425 A1 Jul. 18, 2002

(51) Int. Cl.
G06F 3/00 (2006.01)
G06F 15/16 (2006.01)
G06F 3/12 (2006.01)

(52) U.S. Cl. .................. 715/740; 715/744; 715/748; 709/200; 710/8

(58) Field of Classification Search ............... 345/733, 345/734, 740, 748, 749; 709/1, 103, 200, 709/203, 212, 217, 220, 219, 201; 715/744, 715/747, 740, 745, 748; 710/8, 10; 358/1.15
See application file for complete search history.

(56) References Cited

U.S. PATENT DOCUMENTS 6,003,065 A * 12/1999 Yan et al. .................. 709/201
6,078,967 A * 6/2000 Fulghum ..................... 710/2
6,272,674 B1 * 8/2001 Holiday, Jr. ................ 717/174
6,453,127 B1 * 9/2002 Wood et al. ................. 399/8
6,456,388 B1 * 9/2002 Inoue et al. ............... 358/1.15
6,530,080 B1 * 3/2003 Fresko et al. ............. 717/166
6,580,520 B1 * 6/2003 Teradaira et al. ......... 358/1.15
6,654,784 B1 * 11/2003 Wei ............................ 709/203
2002/0097262 A1 * 7/2002 Iwase et al. ............... 345/744

FOREIGN PATENT DOCUMENTS

EP 0810522 A2 12/1997
EP 0847008 A2 6/1998
EP 1037145 A2 9/2000
JP 11306107 4/1998

* cited by examiner

Primary Examiner—Kieu D. Vu
Assistant Examiner—Ting Zhou

(57) ABSTRACT

An appliance application loading system is provided for a network environment. The system includes a client, a web application server, an appliance, and a loading mechanism. The web application server communicates with the client within the network environment. The appliance is communicably attached with the web server within the network environment. The loading mechanism is provided on the network-based appliance and is operative to download an application to the appliance from the web application server upon the occurrence of a power on/off cycle. A method is also provided.

21 Claims, 3 Drawing Sheets

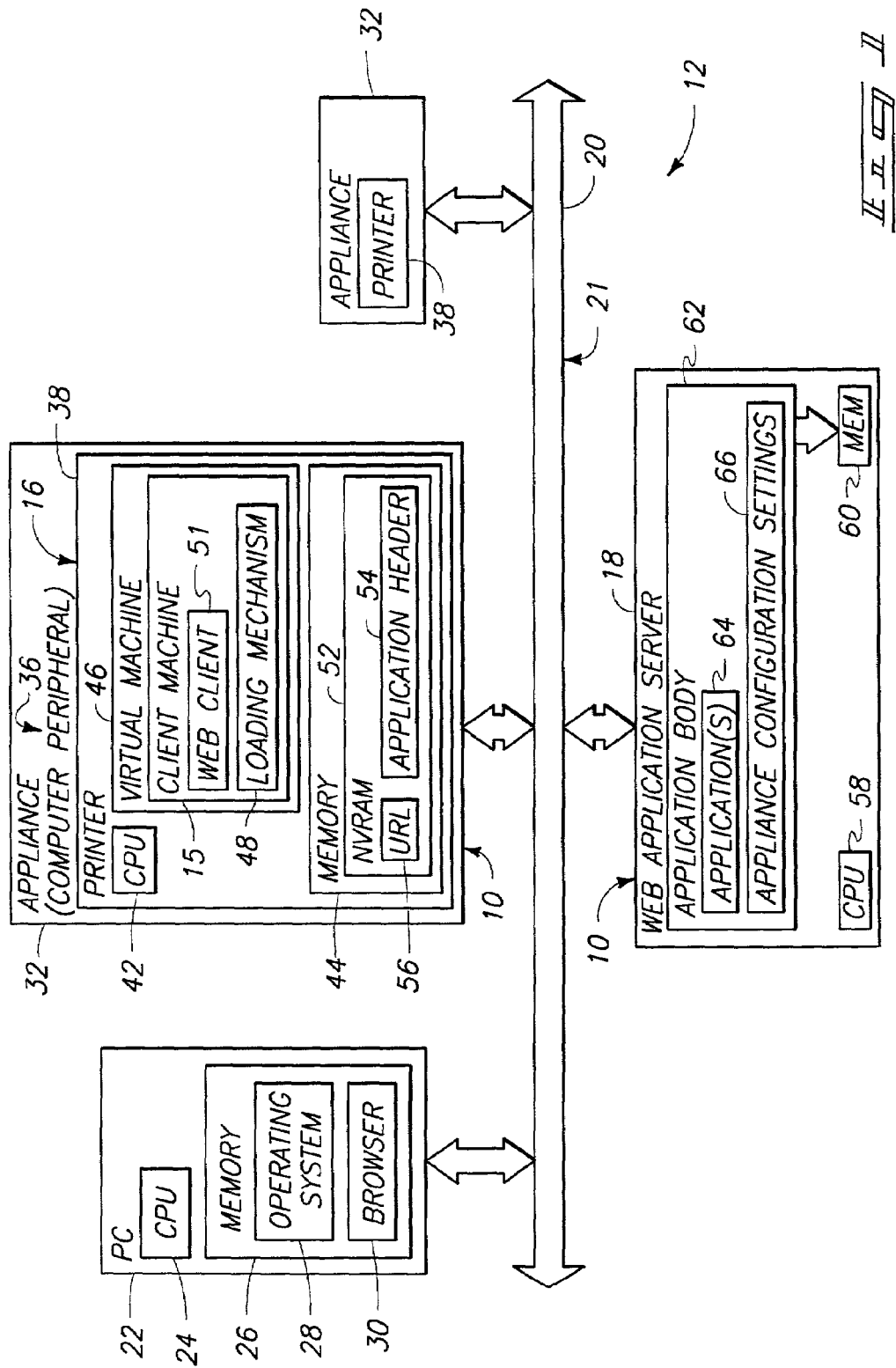

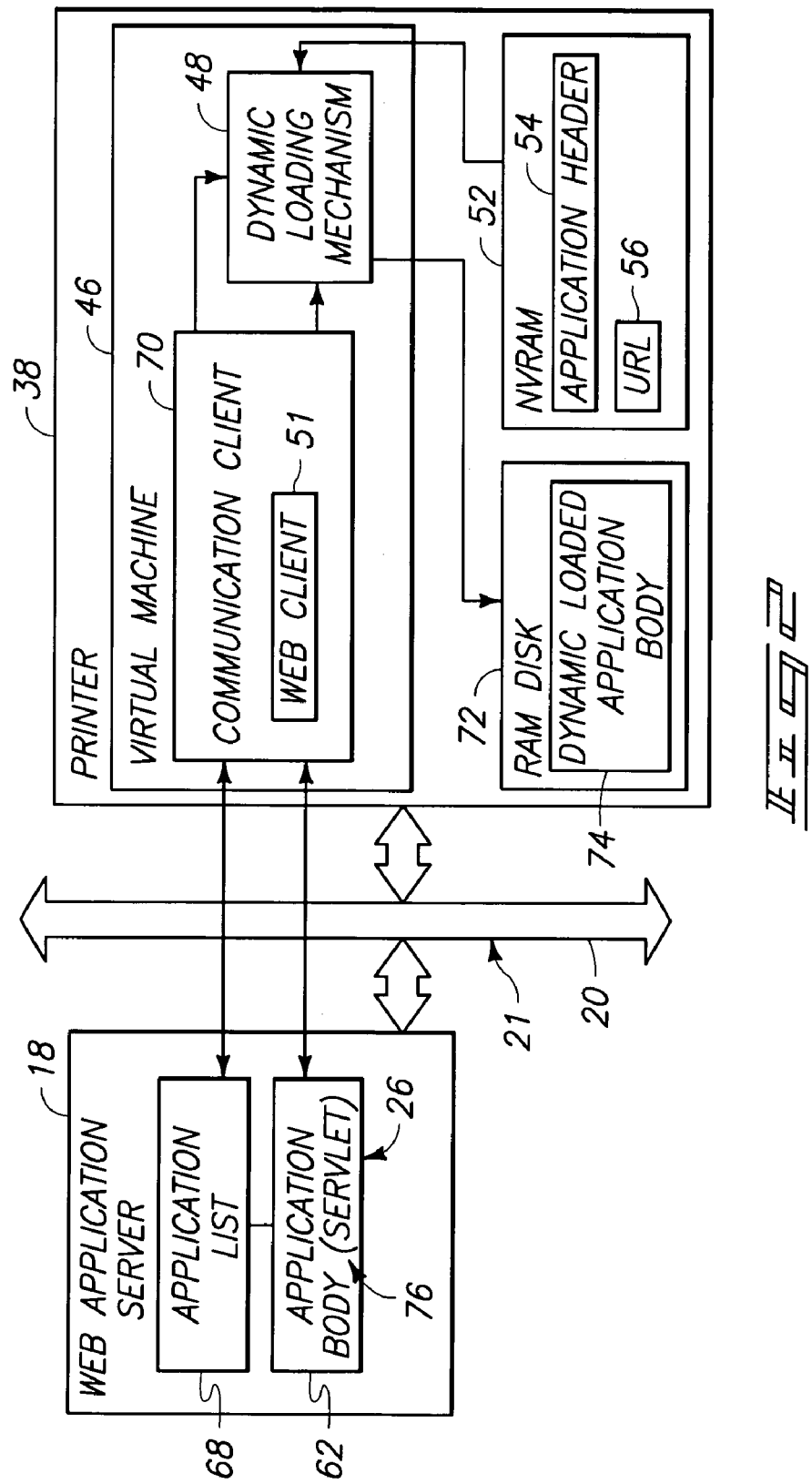

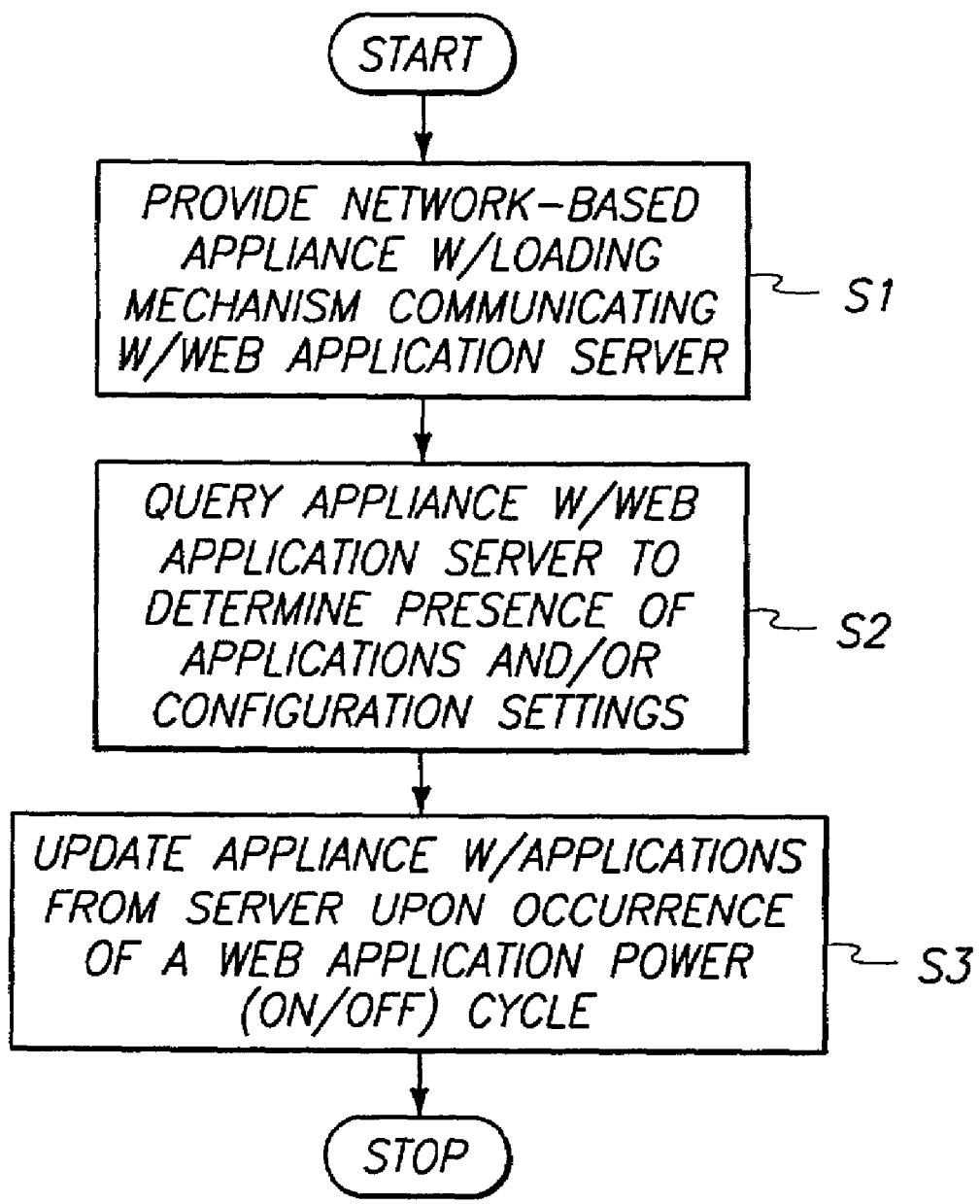

APPARATUS AND METHOD FOR UPDATING APPLICATIONS TO EMBEDDED DEVICES AND PERIPHERALS WITHIN A NETWORK ENVIRONMENT

FIELD OF THE INVENTION

This invention pertains to networked peripheral devices for computer systems. More particularly, this invention relates to extendable architecture applications that allow versioning, updating, and remote configuration of peripheral devices such as printers via a web application server.

BACKGROUND OF THE INVENTION

Until recently, the implementation of extendable architecture applications for a printer has usually required the building of specially designed read-only memory (ROM) dual in-line memory modules (DIMMs) which are installed into a printer. However, the design and installation is costly and complex, thereby reducing the availability of such extendable architecture applications to consumers.

More recently, the addition of a JAVA™ Virtual Machine (VM) and World Wide Web (WWW) accessibility to embedded devices such as hand-held devices and printers has enabled device developers to build JAVA™ applications to run extendable architecture programs. However, in order for these programs to persist after a power cycle or reboot, there is a need to permanently store them on the device. Additionally, there has also been a trend to reduce the cost and complexity of Internet appliances and peripheral devices. As a result, some embedded devices unfortunately lack the luxury of permanent storage due to cost or hardware limitations. Therefore, such devices cannot benefit from extendable architecture programs.

One recent solution has been provided for loading objects to a printer from a uniform resource locator (URL) over the World Wide Web (WWW) or some other Internet facility. The solution, referred to as "Chai Loader", performs the task of loading objects to the printer from a URL, and is provided by "Chai", an integrated suite of software products, development tools and services for designing information appliances, available from Hewlett-Packard Company, of Palo Alto, Calif., assignee of the present invention. Chai Loader is designed to download a package in its entirety to the printer's Flash Non-Volatile memory. Chai Loader also has the ability to download the content of a package to a RAM disk. However, once the power is turned off, the package disappears and the download process must start all over again at the next power-up. Accordingly, in order to allow a simple embedded device to run powerful applications, improvements are needed to address the lack of permanent storage.

SUMMARY OF THE INVENTION

A computer peripheral program product and method are provided for loading applications to appliances, wherein the product has a package, or application, type that includes an application header and an application body. The application header is of sufficiently small size to be capable of being stored within a limited memory allocation on an appliance, such as on a limited amount of non-volatile random access memory (NVRAM).

According to one aspect, an appliance application loading system is provided for a network environment. The system includes a client, a web application server, an appliance, and a loading mechanism. The web application server communicates with the client within the network environment. The appliance is communicably attached with the web server within the network environment. The loading mechanism is provided on the network-based appliance and is operative to download an application to the appliance from the web application server upon the occurrence of a power on/off cycle.

According to another aspect, a computer peripheral program product is provided having a web application server, a network environment, a computer peripheral, and an application loader. The application loader is operative to load an extendable architecture application to the computer peripheral so as to enable versioning, updating, and remote configuration of the computer peripheral via the web application server. The application loader associates an application header of the computer peripheral and an application body of the web application server.

According to yet another aspect, a method is provided for updating applications to embedded devices. The method includes: providing a network-based appliance communicably attached with a web application server, the appliance having a loading mechanism to download an application to the appliance from the server; querying the appliance with the web server to determine presence of an application; and updating the appliance with the application from the server upon the occurrence of a power on/off cycle.

DESCRIPTION OF THE DRAWINGS

Preferred embodiments of the invention are described below with reference to the following accompanying drawings depicting examples embodying the best mode for practicing the invention.

FIG. 1 is schematic block diagram of a computer program peripheral product comprising an appliance application loading system and provided in a network environment.

FIG. 2 is a further detailed schematic block diagram of a printer and server of FIG. 1.

FIG. 3 is a logic flow diagram illustrating the steps taken to implement one aspect of Applicant's invention.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

Reference will now be made to a preferred embodiment of Applicant's invention. One exemplary implementation is described below and is depicted with reference to the drawings comprising a system and method for loading printer applications that form extendable architecture applications from the World Wide Web (WWW). While the invention is described via a preferred embodiment, it is understood that the description is not intended to limit the invention to this embodiment, but is intended to cover alternatives, equivalents, and modifications that are broader than the disclosed embodiment such as are included within the scope of the appended claims.

In an effort to prevent obscuring the invention at hand, only details germane to implementing the invention will be described in great detail, with presently understood peripheral details being incorporated by reference, as needed, as being presently understood in the art.

For purposes of this disclosure, the term "client machine" refers to any portable computing device that is plugged into a network such as a user workstation that attaches to a network. In one instance, a "client machine" is provided by a personal computer. In another instance, a "client machine" is provided within an intelligent computer peripheral such as a printer.

For purposes of this disclosure, the term "servlet" is understood to refer to a relatively small application that runs on an Internet or intranet web server or an embedded device web server. Preferably the application is programmed in "Chai", an embedded JAVA™ architecture from Hewlett-Packard Company, of Palo Alto, Calif. Optionally, it can be programmed in JAVA™.

Also for purposes of this disclosure, the term "Chai Loader" is understood to refer to an enhanced space-optimizing JAVA™ class loader provided in a "Chai" architecture and also available from Hewlett-Packard Company, of Palo Alto, Calif., that is provided in a Chai virtual machine, or JAVA™ machine, or application loading mechanism.

A preferred embodiment appliance application loading system in accordance with the present invention is first described with reference to FIGS. 1-4 and is designated generally with reference numeral 10. Appliance application loading system 10 is implemented within a network environment 12 comprising a plurality of devices capable of providing a client machine. Such devices include personal computer (PC) 22, and appliances 32. PC 22 and appliances 32 communicate with a web application server 18 by way of a communication link 20. According to one implementation, communication link 20 comprises a transmission channel such as a wire transmission channel. Alternatively, communication link 20 comprises a wireless transmission channel.

According to one construction, network environment 1 2 comprises a network computer system and communication link 20 is provided by the Internet 21, and more particularly, the World Wide Web (WWW). Accordingly, network environment 12 comprises a client/server network having one or more clients, such as client 15, and a web application server 18.

As shown in FIG. 1, PC 22 is provided in the form of a standard computer including a central processing unit (CPU) 24 and memory 26. According to one implementation, PC 22 provides a client machine. Memory 26 is operative to store computer programs such as an operating system 28 and a browser 30.

As shown in FIG. 1, a pair of substantially identical appliances 32 each include a printer 38. Details of printer 38 are shown with reference to one of appliances 32. However, it is understood that the other appliance 32 is similarly constructed. According to one construction, appliance 32 comprises a computer peripheral 36 such as printer 38. In one form, printer 38 is an embedded device 16. Accordingly, a pair of printers 38 is provided within the network environment of FIG. 1.

As shown in FIG. 1, each printer 38 includes a central processing unit (CPU) 42 and memory 44. A JAVA™ virtual machine (VM) 46 is provided by appliance 32. Virtual machine 46 provides client machine 15, including a web client 51 and a loading mechanism 48. Virtual machine 46 includes web client 51 and loading mechanism 48 of client machine 15 to enable retrieval of data from web application server 18. In one form, memory 44 comprises a non-volatile storage device such as NVRAM 52. A package, or application, header 54 and a universal resource locator (URL) 56 are provided within NVRAM 52.

In one form, JAVA™ virtual machine (VM) 46 comprises a "Chai" VM, a virtual machine for running JAVA™ applications, embedded browsers or providing network connectivity, and available from Hewlett-Packard Company, of Palo Alto, Calif. Further details are available at http://www.chai.hp.com.

Appliances 32 provide a first printer and a second printer, respectively, present within network environment 12. Accordingly, it is understood that printers 38 are constructed similar to one another such that a pair of printers is provided within network environment 12.

Web application server 18 comprises a central processing unit (CPU) 58 and memory 60. Server 18 also includes a web site and one or more web pages (not shown). One or more application bodies 62 is retrievably stored within memory 60, including one or more applications 64 and appliance configuration settings 66.

As shown in FIG. 2, printer 38 and web application server 18 are used to illustrate one construction for appliance application loading system 10 of FIG. 1. Web application server 18 comprises one or more applications of application body 62 and an associated application list 68. Printer 38 comprises a communication client 70, dynamic loading mechanism (or application loader) 48, a RAM disk 72 and NVRAM 52. Communication client 70 and dynamic loading mechanism 48 cooperate to provide a virtual machine, such as a JAVA™ virtual machine which includes a web client 51 within communication client 70.

RAM disk 72 is used to store downloaded applications 64 (of FIG. 1) in the form of dynamic loaded application bodies 74 which are received from web application server 18. NVRAM 52 comprises a package, or application, header 54 and a universal resource locator (URL) 56 which gives the location of an application on web application server 18.

In an effort to reduce the amount of memory needed by printer 38, a new package or application type has been created that consists of two parts; namely, a package (or application) header 54, and a package (or application) body 62. RAM disk 72 contains a copy of downloaded application body 74 which is retrieved from application body 62 using dynamic loading mechanism 48 via communication client 70.

Application header 54 is sized sufficiently small to fit in a relatively small amount of NVRAM 52. Application header 54 contains essential information about the application and a corresponding Universal Resource Locator (URL) on application web server 18. Application 64, on the other hand, is then provided on application web server 18 at the corresponding URL 56 described above.

When printer 38 is booted up, dynamic loading mechanism 48 interrogates NVRAM 52, looking for loadable applications by reviewing application header 54 and URL 56. Upon finding application header 54 comprising a lightweight application or package header, printer 38 "surfs" to corresponding URL 56 via web application server 18 using web client 51 of virtual machine 46. In this manner, printer 38 obtains application body 62 and any associated applications 64 (see FIG. 1). The applications are then stored in a downloaded form within RAM disk 72 comprising application body 74. In this manner, application bodies 74, comprising one or more applications, are then run directly from RAM disk 72 by printer 38 in order to deliver such functionality.

In the event that printer 38 goes through a power cycle, application body 62 is loaded again in the manner described above.

According to one construction, application body 62 is implemented as a servlet 76 located on application web server 18. Servlet 76 comprises a program that runs on a web server. Such program executes when an individual or a machine (i.e., printer 38) surfs to a location designated by URL 56 on web application server 18. Parameters can be passed to servlet 76 as part of a URL string. Servlet 76 provides printer 38 with an off-the-printer permanent storage interface. Printer 38 can execute servlet 76 with parameters to download the printer's packages; download the specific printer's configuration settings; and/or change that printer's configuration on the application web server. Such a feature is a natural extension of having the ability to run servlet 76 on a host (in this case, server 18) and the ability to access servlet 76 from printer 38. Every time a user changes the settings on printer 38, the dynamic loading mechanism 48 will surf to servlet 76 to update the configuration settings for printer 38.

Applicant's invention enables devices having minimum permanent storage and connection to the Internet the ability to run applications as if they were stored permanently on the device. Prior to this invention, there existed a need to add a flash memory device to the printer in order to provide such necessary permanent storage.

The permanent storage requirements for the present approach are minimized through implementation of the present invention. NVRAM 52 need only be sized sufficiently to provide enough room to store URL 56 for servlet 76 or application body 62 of web application server 18, as well as to provide for storage of application header 54 which describes sufficiently the specific application located at URL 56. However, printer 38 surfs to servlet 76 via web client 51 every time a change occurs to the operating state of printer 38 in order to save the new state of the printer (and its configuration) on web application server 18. This feature enables printer 38 to recover applications (or application bodies) as well as printer settings after the occurrence of a power cycle.

Web application server 18 provides a central location to store printer applications and configuration settings, thereby enabling plural printer configuration setups. For example, printers 38 of FIG. 1 can be simultaneously set up with new printer configuration settings that are retrieved from web application server 18. Additionally, or alternatively, one of printers 38 can be set up to have appropriate user settings for a first user who utilizes such first printer 38 locally, and the other printer 38 can be set up with a second set of user settings and an application for a second user that uses the other printer 38 remotely at a second location. The resulting information is then transferred to servlet 76 on application web server 18 from each respective printer.

Accordingly, one or more printers can be pointed to the same configuration setup information comprising a dedicated servlet. In this manner, when all the printers within a network environment subsequently go through a power cycle, the printers are automatically updated to have the same applications and configuration settings which are saved within a dedicated servlet 76 within web application server 18. Such printers can be delivered identical servlets, or optionally can be delivered separate, dedicated servlets for each printer which encompass specific appropriate user settings for each dedicated printer.

Utilization of dynamic loading mechanism 48, in combination with application header 54 and URL 56, enables the versioning and updating of applications in a relatively easy manner because content on web application server 18 can be modified without requiring that a user make such modification separately on each printer that is present within a network environment. Furthermore, code on web application server 18 can be updated with fixes to viruses or bugs, and to include new revisions, merely by updating servlet 76. Corresponding download and update of such code is carried out automatically the next time the printer (or appliance) is power cycled.

In order to better understand the claimed aspects of Applicant's invention, one example is presented below for updating an appliance or printer with an application from a web application server utilizing the appliance application loading system of Applicant's invention. More particularly, FIG. 3 illustrates logic processing used to update an appliance with an application utilizing a loading mechanism.

In Step "S1", a network-based appliance having a loading mechanism is provided in communication with a web application server. In one form, the appliance comprises a printer having printer configuration states. In another form, a plurality of appliances are communicably attached with a web application server, with each appliance having a dedicated loading mechanism. The web application server is configured to store appliance applications and configuration settings to enable plural appliance configuration setup to version and update such appliances individually or as a group. After performing Step "S1", the process proceeds to Step "S2".

In Step "S2", the web application server queries the appliance to determine the presence of applications and/or appliance configuration settings such as printer settings and/or user settings. After performing Step "S2", the process proceeds to Step "S3".

In Step "S3", the loading mechanism cooperates with the web application server to update the appliance with one or more applications from the web application server upon occurrence of a power (on/off) cycle. According to one implementation, updating comprises configuring the printer with a printer application including a printer configuration state. According to one such implementation, the printer configuration state includes user settings. Also according to one implementation, the printer configuration state includes a servlet on the web application server that is transferred to the printer in response to a power cycle that automatically updates the applications and configuration settings for the appliance. After performing Step "S3", the process is either terminated, or after some delay, returns to Step "S1" and repeats.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An appliance application loading system for a network environment, comprising:
   a client;
   a web application server communicating with the client within the network environment and configured as a central location to store applications and configuration settings for an appliance to enable configuration setups for a plurality of appliances;
   a plurality of network-based appliances communicably attached with the web server within the network environment, wherein the network-based appliances each include an embedded device having a non-volatile storage device; and a loading mechanism provided on the network-based appliance and operative to download a first application to one of the appliances and a second application to another of the appliances from the web application server upon the occurrence of a power on/off cycle, wherein the loading mechanism is configured to deliver the first application in a first, dedicated servlet to the one appliance and deliver the second application in a second, dedicated servlet to the another appliance where the second, dedicated servlet is unique from the first, dedicated servlet, a first application header and a first universal resource locator (URL) are stored on the non-volatile storage device for the one appliance and a second application header and a second universal resource locator (URL) are stored on the non-volatile storage device for the another appliance, first and second application bodies are provided on the web server at a location corresponding with the URL for the one appliance and the another appliance, respectively, the URL being initialized to access the respective application body when the loading mechanism detects the respective application header, the loading mechanism is configured to automatically update one of the first dedicated servlet and the second dedicated servlet responsive to a user locally changing desired settings for one of the one appliance and the another appliance, respectively, and one of the first and second application bodies is configured to execute when one of a user and a selected one of the appliances accesses the respective application body at the URL to download at least one of the appliance packages, appliance configuration settings; and change configuration of the respective appliance on the web application server.

2. The appliance application loading system of claim 1 wherein the loading mechanism is provided at least in part by the client.

3. The appliance application loading system of claim 1 wherein each of the servlets is provided on the web server.

4. The appliance application loading system of claim 1 wherein each of the network-based appliances comprises an embedded device, and the loading mechanism comprises a virtual machine.

5. The appliance application loading system of claim 1 wherein each of the network-based appliances uses the loading device to download specific appliance configuration settings.

6. The appliance application loading system of claim 5 wherein each of the appliances comprises an embedded device, and the loading mechanism comprises a program routine that copies an application program into memory of the embedded device from the web server for execution.

7. The appliance application loading system of claim 1 further comprising a first network-based appliance and a second network-based appliance, wherein the loading mechanism sets up the one network-based appliance to have user settings for a first user who uses the one network-based appliance locally, and the loading mechanism sets up the another network-based appliance to have user settings for a second user who utilizes the another network-based appliance locally, but remotely from the first network-based appliance.

8. The appliance application loading system of claim 7 wherein the first network-based appliance comprises one printer and the second network-based appliance comprises another printer, the server is configured to update each unique application with fixes to software viruses, and the loading mechanism is configured to download a first and second updated unique application to the one printer and the another printer, respectively.

9. The appliance application loading system of claim 8 wherein the loading mechanism utilizes the application body comprising the respective, dedicated servlet, wherein the one printer is delivered one servlet and the another printer is delivered another servlet, wherein the one servlet comprises specific appropriate user settings for the one printer and the another servlet comprises specific appropriate user settings for the another printer.

10. A computer peripheral program product, comprising:

a web application server configured as a central location to store applications and configuration settings for computer peripherals to enable configuration setups for a plurality of computer peripherals;

a network environment;

at least two computer peripherals; and an application loader is configured to deliver a first application in a first, dedicated servlet to one computer peripheral and deliver a second application in a second, dedicated servlet to another computer peripheral where the second, dedicated servlet is unique from the first, dedicated servlet and to load a unique extendable architecture application to each of the at least two computer peripherals so as to enable versioning, updating, and remote configuration of the at least two computer peripherals via the web application server;

wherein the application loader associates a first application header of a first computer peripheral with a first application body of the web application server and a second application header of a second computer peripheral with a second application body of the web application server, wherein each of the applications includes a respective application header having identification information for the application and a uniform resource locator (URL) to the application body, the application body including one or more individual applications that can be loaded on the computer peripheral, the URL being initialized to access the application body when the application loader detects the application header, and the application loader is configured to automatically update one of the first dedicated servlet and the second dedicated servlet responsive to a user locally changing desired settings for one of the first computer peripheral and the second computer peripheral, respectively, and one of the first and second application bodies is configured to execute when one of a user and a selected one of the computer peripherals accesses the respective application body at the URL to download at least one of the appliance packages, and at least one of the appliance configuration settings; and to change configuration of the respective computer peripherals on the web application server.

11. The computer peripheral program product of claim 10 wherein each of the computer peripherals comprises a virtual machine including a web client.

12. The computer peripheral program product of claim 10 wherein one of the computer peripherals comprises a printer, and updating comprises configuring the one printer with a printer application comprising a printer configuration state.

13. The computer peripheral program product of claim 12 wherein the printer configuration state comprises user settings.

14. The computer peripheral program product of claim 12 wherein the printer configuration state is provided on one of the servlets on the web application server that transfers applications and settings to the printer in response to a power cycle that automatically updates the applications and configuration settings for the printer.

15. A method for updating applications to embedded devices, comprising:

provide a plurality of network-based appliances each communicably attached with a web application server, each of the appliances having a loading mechanism to download an application to the appliance from the server;

querying one of the appliances and another of the appliances with the web server to determine presence of an application header for the one appliance and the another appliance;

updating the one appliance with a first separate, dedicated application from the server including a first set of user settings for the one appliance and a second separate, dedicated application from the server including a second set of user settings unique from the first set of user settings and for the another appliance upon the occurrence of a power on/off cycle and upon detecting the presence of the application header;

changing desired user settings for one of the one appliance and the another appliance locally of the respective appliance; and automatically updating one of a first dedicated servlet and a second dedicated servlet responsive to a user locally changing desired user settings for one of the one appliance and the another appliance, respectively.

16. The method of claim 15 wherein the appliance comprises an embedded device, and updating comprises configuring the embedded device with an application comprising an embedded device configuration state.

17. The method of claim 16 wherein the embedded device configuration state comprises user settings.

18. The method of claim 16 wherein the embedded device configuration state comprises a servlet on the web application server that is transferred to the embedded device in response to a power cycle that automatically updates the applications and configuration settings for the embedded device.

19. The method of claim 15 wherein a plurality of appliances are communicably attached with the web application server each with a dedicated one of the loading mechanism, wherein the web application server stores appliance applications and configuration settings to enable plural appliance configuration setup to version and update such applications.

20. An appliance application loading system for a network environment, comprising:

a client;

a server communicating with the client;

a plurality of network-based appliances communicably attached with the server, the network-based appliances each including an embedded device having a non-volatile storage device; and a loading mechanism provided on the network-based appliance and operative to deliver a first application in a first, dedicated servlet to one appliance and deliver a second application in a second, dedicated servlet to another appliance where the second, dedicated servlet is unique from the first, dedicated servlet and to download a unique application to each of the network-based appliances from the server upon the occurrence of a power on/off cycle, wherein an application header and a universal resource locator (URL) are stored on the non-volatile storage device of each appliance, and an application body, having a servlet, is provided on the server at a location corresponding with the URL for each appliance, the URL being initialized to access the application body when the loading mechanism detects the application header;

wherein servlet settings corresponding to each of the network-based appliances are automatically updated via the loading mechanism to each appliance if a user locally changes settings of the network-based appliance.

21. The system of claim 20, wherein each of the dedicated servlets is configured to have settings that are unique to each of the network-based appliances.

* * * * *